(12) United States Patent
Han et al.

(10) Patent No.: US 7,464,337 B2
(45) Date of Patent: Dec. 9, 2008

(54) MULTIMEDIA COMMUNICATION METHOD USING VIRTUAL WORLD INTERFACE IN MOBILE PERSONAL COMPUTERS

(75) Inventors: Kyungsook Han, Inchon (KR); Sangrae Lee, Kyongsangnam-do (KR)

(73) Assignee: Inha University Foundation, Inchon (KR)

( * ) Notice: Subject to any disclaimer, the term of this patent is extended or adjusted under 35 U.S.C. 154(b) by 881 days.

(21) Appl. No.: 10/344,080

(22) PCT Filed: Feb. 26, 2001

(86) PCT No.: PCT/KR01/00290

§ 371 (c)(1),
(2), (4) Date: Feb. 6, 2003

(87) PCT Pub. No.: WO02/13030

PCT Pub. Date: Feb. 14, 2002

(65) Prior Publication Data

US 2003/0177195 A1    Sep. 18, 2003

(30) Foreign Application Priority Data

Aug. 8, 2000    (KR) ............... 2000-45935

(51) Int. Cl.
G06F 3/00    (2006.01)
G06F 3/048    (2006.01)

(52) U.S. Cl. .......... 715/738; 715/758; 715/752; 715/753; 715/757

(58) Field of Classification Search ........ 715/738, 715/758
See application file for complete search history.

(56) References Cited

U.S. PATENT DOCUMENTS

| | | | |
|---|---|---|---|
| 5,801,700 A * | 9/1998 | Ferguson .............. | 715/748 |
| 6,219,045 B1 * | 4/2001 | Leahy et al. .......... | 715/757 |
| 6,496,851 B1 * | 12/2002 | Morris et al. ........ | 709/204 |
| 6,704,031 B1 * | 3/2004 | Kimball et al. ....... | 715/745 |
| 6,910,186 B2 * | 6/2005 | Kim .................... | 715/706 |
| 6,948,131 B1 * | 9/2005 | Neven et al. .......... | 715/753 |
| 7,086,005 B1 * | 8/2006 | Matsuda ............... | 715/706 |

* cited by examiner

*Primary Examiner*—Ba Huynh
*Assistant Examiner*—Shashi K Becker
(74) *Attorney, Agent, or Firm*—Bachman & LaPointe, P.C.

(57) ABSTRACT

A method for communication of multimedia data using virtual world interface in a mobile personal computers is disclosed. The method comprises logging in to the server; displaying an initial menu picture on a screen of the mobile personal computer, the initial menu picture including a plurality of menu items for transmission or retrieval of the multimedia data; and performing a subroutine associated with a selected one of the menu items in the initial menu picture to transmit or retrieve the multimedia data. According to this invention, information can rapidly and accurately be exchanged at any time or place. Further, desired media data can conveniently be transmitted or retrieved by merely a clicking operation of a stylus pen or a drag operation of a mouse without executing a multiplicity of individual programs for transmission and/or retrieval of different media data.

2 Claims, 14 Drawing Sheets

MULTIMEDIA COMMUNICATION METHOD USING VIRTUAL WORLD INTERFACE IN MOBILE PERSONAL COMPUTERS

BACKGROUND OF THE INVENTION

1. Field of the Invention

The present invention relates in general to a multimedia communication method in mobile personal computers, and more particularly to the multimedia communication method using a virtual world interface and an instant messenger program.

2. Description of the Prior Art

Mobile personal computers (PCs) are expected to be universally used in the early twenty-first century and absorb all functions of existing telecommunication and information appliances such as pagers, cellular phones, videophones, facsimiles, etc. These mobile PCs signify not only existing handheld computers and personal digital assistants (PDAs), but also light and small PCs having all or some of the infrared port, serial port, radio data communication functions and the like for communication with remote PCs, as well as the performance of desktop PCs, such as wearable PCs (in the form of a wrist watch or bulletproof jacket), auto PCs (such as a PC which is contained in a vehicle to guide a driver or read an electronic mail for the driver in response to a voice command from the driver), etc. Such mobile PCs are expected, on the basis of the following reasons, to absorb all functions of existing telecommunication and information appliances.

1. Development is continuously made of fundamental techniques capable of realizing functions of pagers, cellular phones, videophones and facsimiles in PCs.

2. Mobile PCs, charge coupled devices (CCDs), batteries, etc. are becoming lighter in weight and higher in performance at a very remarkable speed.

3. Peripheral techniques associated with a wireless asynchronous transmit mode (ATM) are being developed. These techniques will replace existing cellular phones and radio data communication systems using them or be used in combination with them.

4. It is much simpler and more convenient for persons to carry and use a single telecommunication/information appliance rather than individual pagers, cellular phones, electronic notes, etc.

On the other hand, it is the current reality that an instant messenger program runs only on either desktop computers or notebook computers. The instant messenger program requires no procedure of server accessing by a user and is made active in response to a request from a different user while online. This program mostly has memo and chatting functions and always runs at a background or foreground.

An ultimate goal of communication techniques can be defined as allowing users to rapidly exchange information with anybody anytime and anywhere. But, either desktop computers or notebook computers are disadvantageously limited in places for use. Mobile PCs, expected to have a multimedia function and be actively spread, will enable rapid communication at any place or time as long as they are able to transmit or retrieve multimedia data using the instant messenger program.

SUMMARY OF THE INVENTION

Therefore, it is an object of the present invention to provide a multimedia communication method using a virtual world interface in mobile personal computers, wherein information can rapidly and accurately be exchanged at any time or place.

It is another object of the present invention to provide a multimedia communication method in mobile personal computers, wherein a mobile personal computer is capable of readily transmitting or retrieving multimedia data using a virtual world interface and an instant messenger program.

It is yet another object of the present invention to provide a multimedia communication method in mobile personal computers, wherein a desired function can be performed by merely a clicking operation of a stylus pen or a drag operation of a mouse without executing a multiplicity of individual programs for transmission and/or retrieval of different media data.

In accordance with the present invention, the above and other objects can be accomplished by a provision of a multimedia communication method in mobile personal computers which includes a virtual world interface and an instant messenger program and is connected to a server over any one of wired and wireless communication networks, the method comprising the first step of logging in to the server; the second step of displaying an initial menu picture on a screen of the mobile personal computer, the initial menu picture including a plurality of menu items for transmission or retrieval of the multimedia data; and the third step of performing a subroutine associated with a selected one of the menu items in the initial menu picture to transmit or retrieve the multimedia data.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

In the following description made in conjunction with the preferred embodiment of the present invention, a variety of specific elements such as the number and names of avatars, types of multimedia data, Windows operating systems and concrete processing are shown. The description of such elements has been made only for a better understanding of the present invention. Those skilled in the art will appreciate that the present invention can be implemented without using the above-mentioned specific elements. In the following description of the present invention, a detailed description of known functions and configurations incorporated herein, for example, a handheld personal computer (PC), personal digital assistant (PDA) and a desktop PC, will be omitted when it may make the subject matter of the present invention rather unclear. Further, in the following description of the present invention, "multimedia data" are defined as including text, handwriting, audio, image, and video data, and an "integrated environment" is defined as a program capable of continuously performing its function in response to a new media data transmission/retrieval request by not modifying an existing program code, but registering an additional component or plug-in program. With this integrated environment program, a user need not execute a multiplicity of individual programs for transmission/retrieval of different media data.

Figure 1:
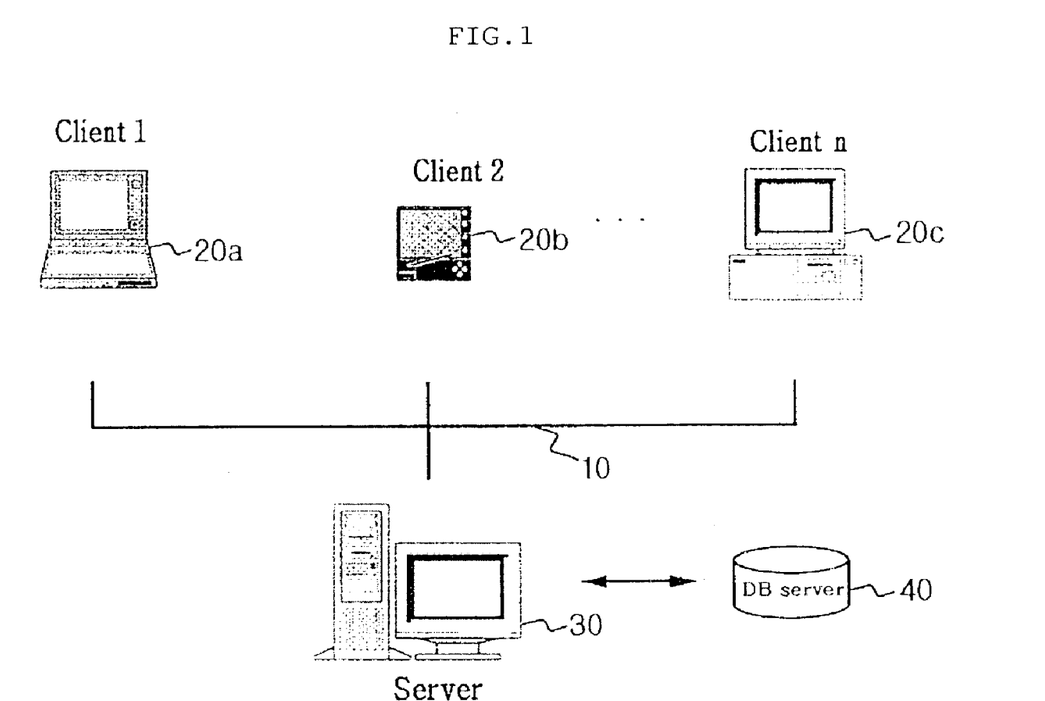
FIG. 1 is a view showing the construction of a system for execution of a multimedia communication method using a virtual world interface in mobile personal computers in accordance with the present invention.

FIG. 1 is a view showing the construction of a system for execution of a multimedia communication method using a virtual world interface in mobile personal computers in accordance with the present invention. As shown in this drawing, the system comprises a messaging server 30 connected to a plurality of clients 20a-20c via a communication line 10 (this line may be associated with both wired/wireless communication networks if a mobile PC supporting radio data communication is used), and a database (DB) server 40 connected to the messaging server 30. Each of the clients 20a-20c can be a handheld PC, PDA, or desktop PC. Preferably, mobile PCs available as clients may be a mobile PC employing Windows CE as its operating system, and a desktop PC and notebook PC employing Windows 95/98/NT/2000 as their operating systems. The messaging server 30 may preferably be a Windows NT 4.0 server.

Now, a description will be given of the multimedia communication method using a virtual world interface of the present invention, which is carried out by the system with the above-mentioned construction, with reference to the accompanying drawings.

Figure 2:
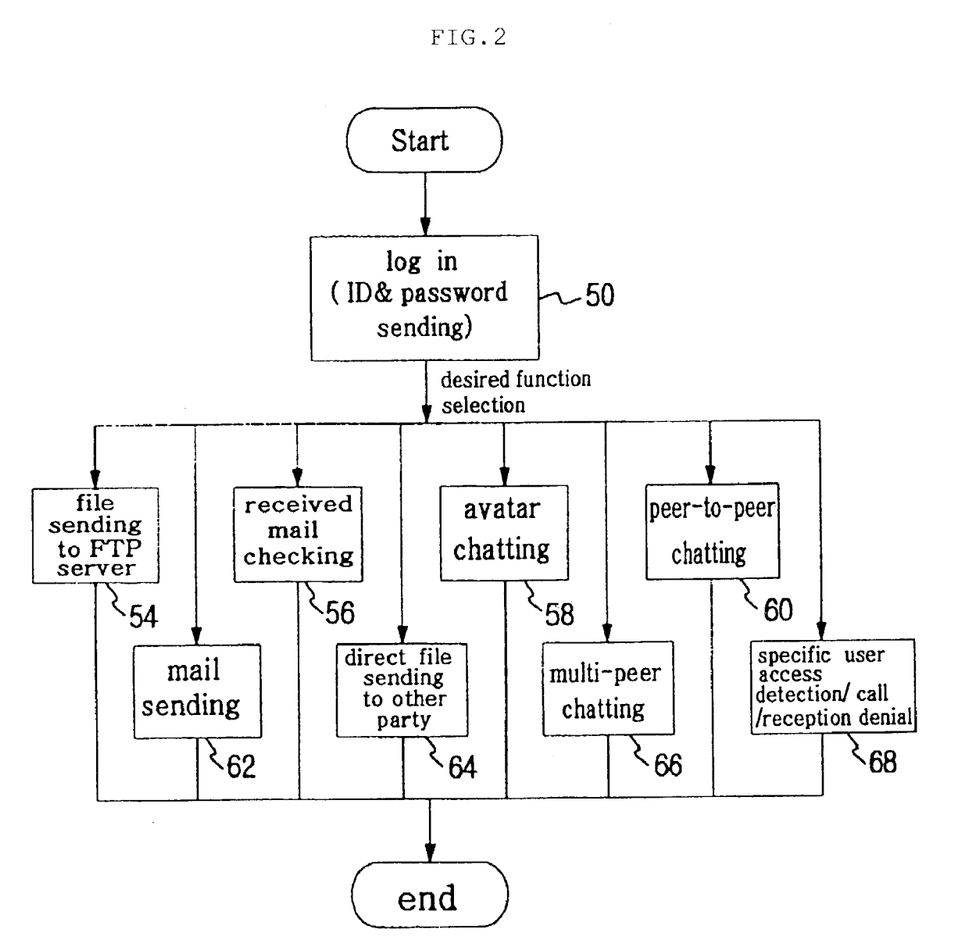
FIG. 2 is a top-level flowchart illustrating the multimedia communication method in accordance with the present invention.
Figure 3:
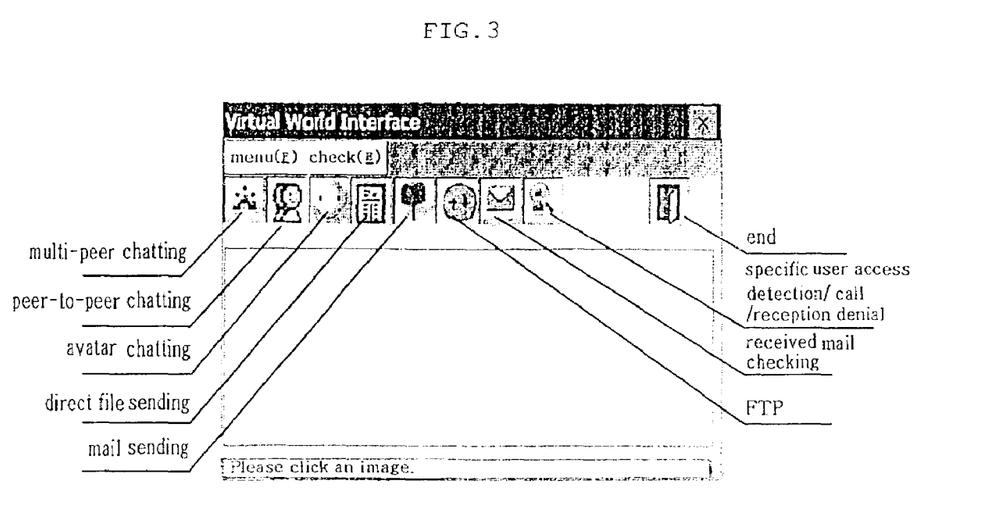
FIG. 3 is a view showing an exemplary initial menu picture displayed on a screen after user authentication, more particularly icon functions in the initial menu picture.

FIG. 2 is a top-level flowchart illustrating the multimedia communication method using a virtual world interface in accordance with the present invention. First, each of the clients 20a-20c, physically connected to the messaging server 30 via the communication line 10, is user-authenticated by the messaging server 30 through a log-in procedure (entering a user identification (ID) and password) at step 50. The user IDs and passwords of the clients must be pre-registered in the DB server 40. Upon user authentication by the messaging server (referred to hereinafter as a server) 30, an initial menu picture as shown in FIG. 3 is displayed on a screen of each of the clients 20a, 20b and 20c such that each client performs desired functions through the server 30 connected thereto. In the preferred embodiment of the present invention, the desired functions may be a variety of functions for transmission or retrieval of multimedia data, for example, a multi-peer chatting function, avatar chatting function, received mail checking function, etc., which are executed at steps 54 to 68 in FIG. 2.

Figure 4:
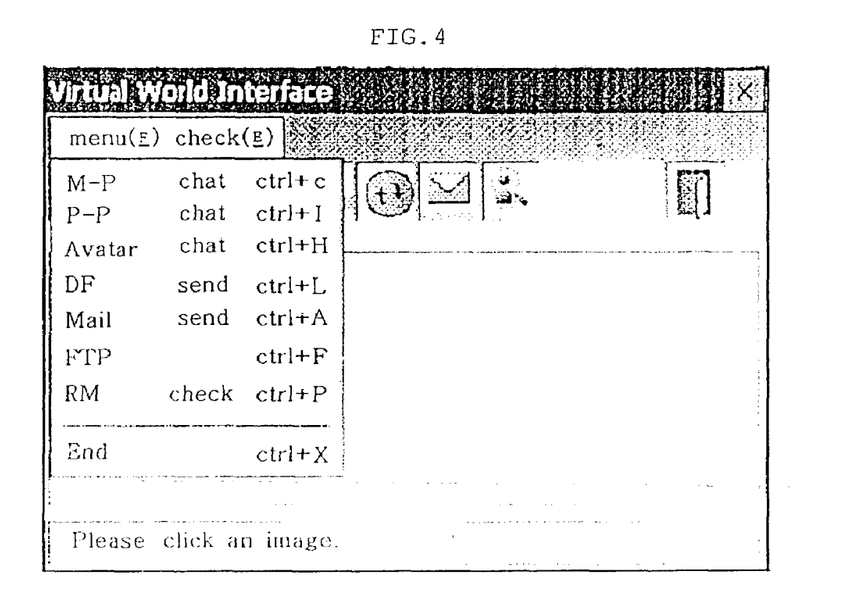
FIG. 4 is a view showing types of services provided in the initial menu picture of FIG. 3.

FIG. 3 is a view showing an exemplary initial menu picture displayed on a screen after user authentication, more particularly icon functions in the initial menu picture, and FIG. 4 is a view showing types of services provided in the initial menu picture of FIG. 3. In the present embodiment, the "initial menu picture" may be referred to as a chatting picture.

Figure 5:
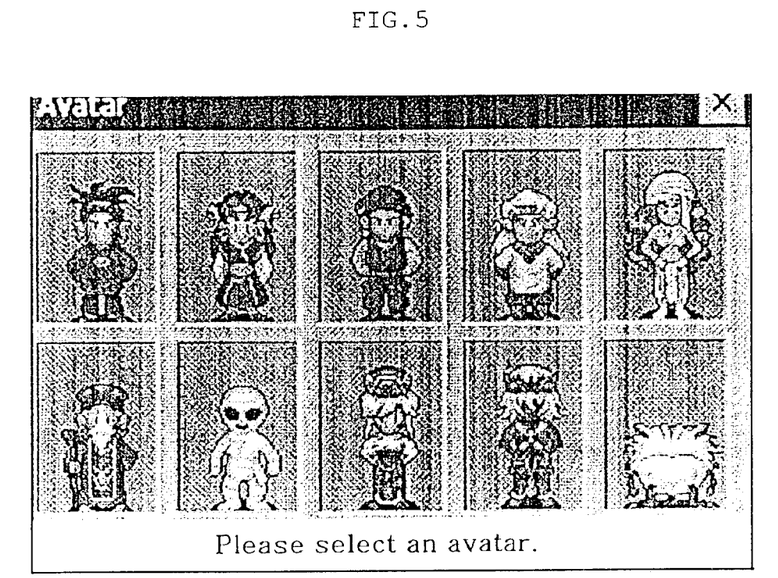
FIG. 5 is a view showing an exemplary avatar selection picture displayed on the screen in accordance with the present invention.
Figure 6:
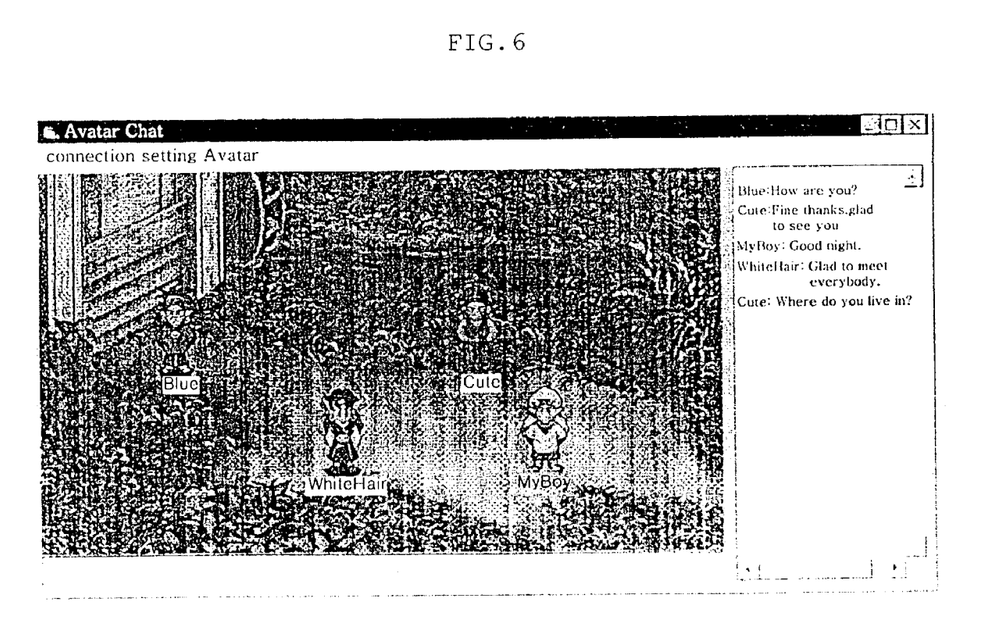
FIG. 6 is a view showing an exemplary avatar chatting picture displayed on the screen when an avatar chatting function is selected in FIG. 2.

If the initial menu picture is displayed on the screen after the user authentication as stated above, then each of the clients 20a, 20b and 20c can conduct a desired type of communication using a virtual world interface as the described hereinafter with a desired client or clients connected to the server 30 on the displayed initial menu picture. In FIG. 2, the reference numeral 54 denotes the step of sending a file to a file transmit protocol (FTP) server, and 56 denotes a received mail check step. Also, the reference numeral 58 denotes an avatar chatting step and 60 denotes a peer-to-peer chatting step. If the avatar chatting function is selected, then avatars as shown in FIG. 5 are displayed on the screen. These avatars represent clients connected to the server 30, respectively, and information thereof must be pre-registered in the DB server 40. An example of chatting using such avatars is shown in FIG. 6.

Figure 7:
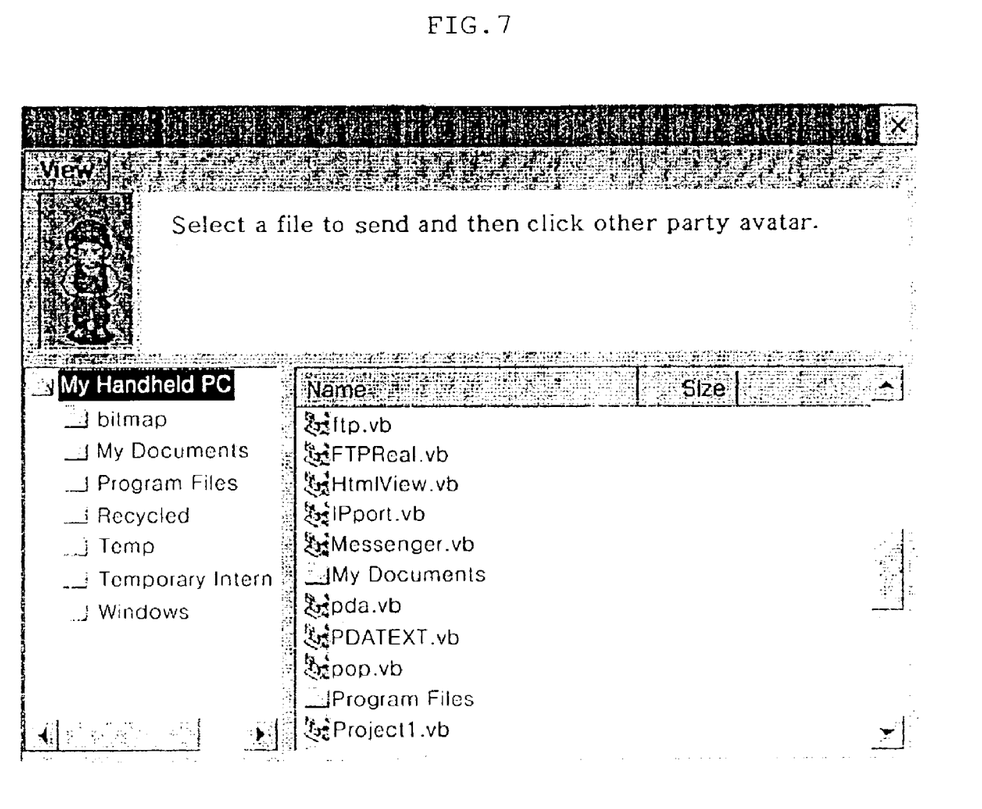
FIG. 7 is a view showing an exemplary picture for avatar selection and file sending in accordance with the present invention.

In FIG. 2, the reference numeral 62 denotes a mail sending step and 64 denotes the step of directly sending a file to the other party. For direct sending to the other party, each client can select a file to be sent, click on an avatar of the other party and then send the selected file directly to the other party. An example of such direct sending is shown in FIG. 7. On the other hand, the reference numeral 66 denotes the step of conducting multi-peer chatting in a chatting room and 68 denotes a specific user access detection/call step and a specific user reception denial step. The above steps 54 to 68 can be executed by selecting associated menu items in the initial menu picture.

Figure 8:
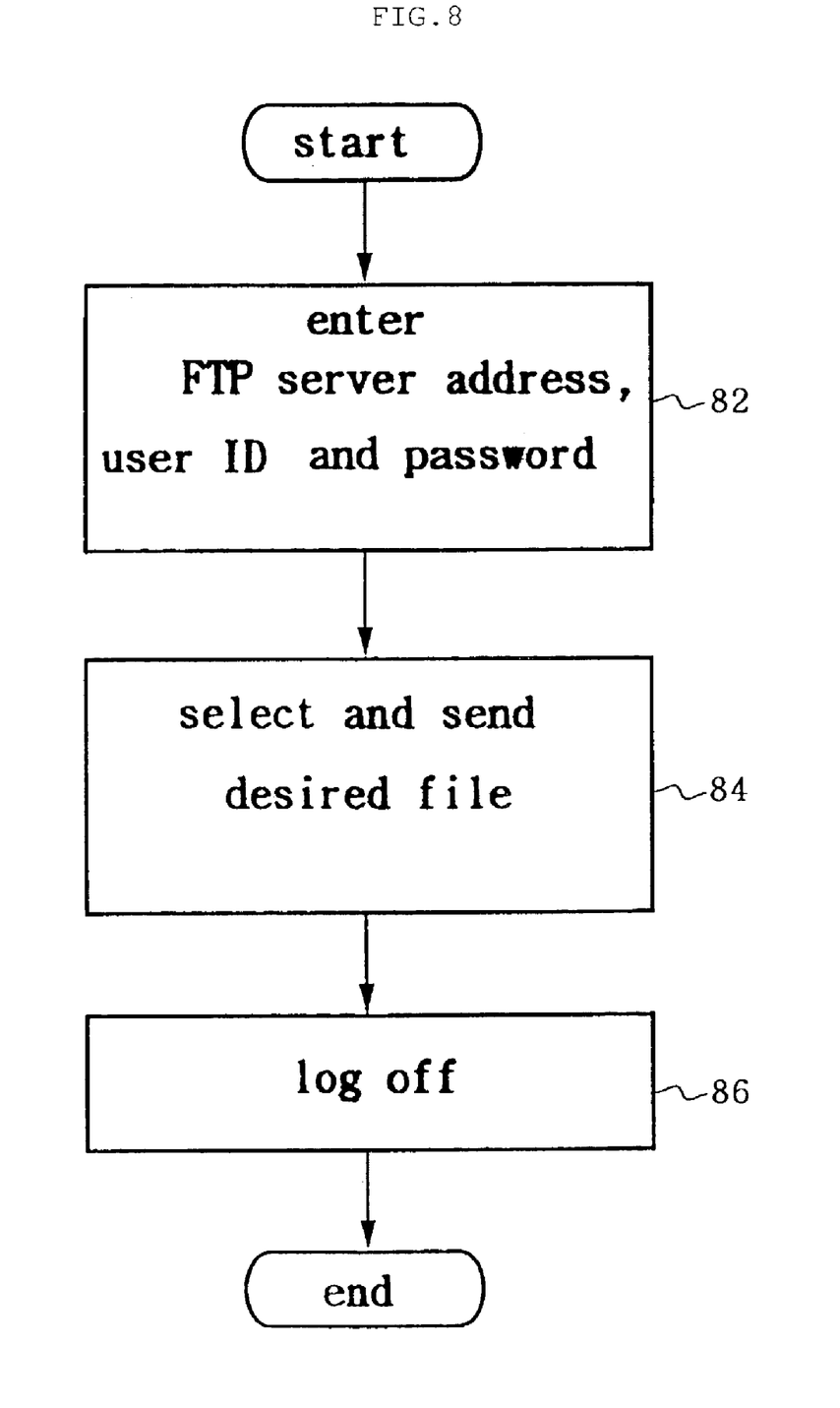
FIG. 8 is a flowchart illustrating the step in FIG. 2 of sending a file to a file transmit protocol (FTP) server.

Hereinafter, a more detailed description will be given of a variety of functions selected in the initial menu picture. FIG. 8 is a flowchart illustrating the step 54 in FIG. 2 of sending a file to the FTP server. For sending of a file to the FTP server, a specific client first enters an "FTP server address", "user ID" and "password" at step 82 to gain access to the FTP server. If the specific client gains access to the FTP server, then it selects a desired file and sends it to the FTP server at step 84. Subsequently, the specific client proceeds to step 86 to log off. Through this procedure, the file sending to the FTP server is completed.

Figure 9:
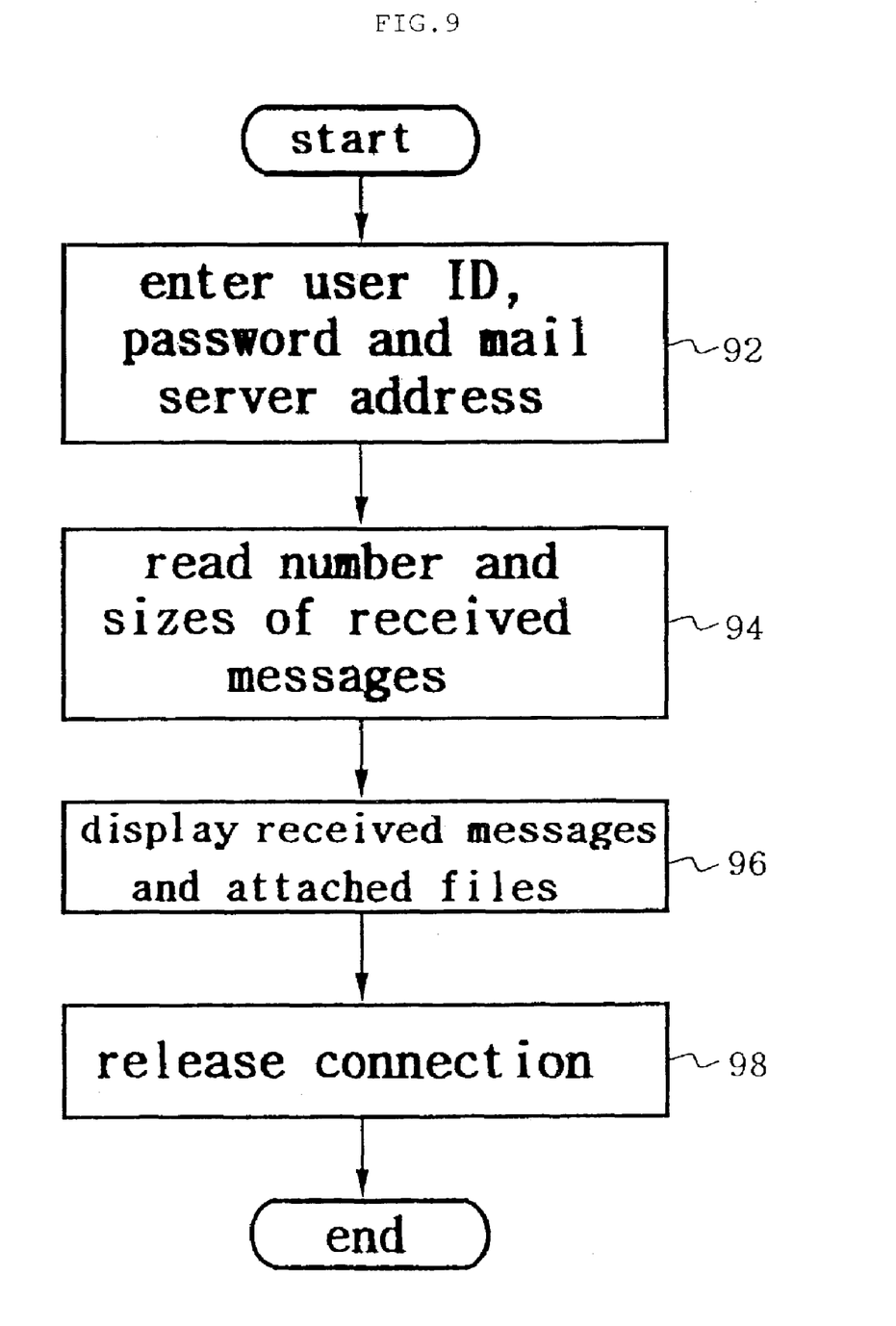
FIG. 9 is a flowchart illustrating a received mail checking step in FIG. 2.

FIG. 9 is a flowchart illustrating the received mail checking step 56 in FIG. 2. For the checking of received mails, a specific client first enters a "user ID", "password" and "mail server address" at step 92 to gain access to the server 30. Then, the specific client reads the number and sizes of received messages from the DB server 40 at step 94 and displays the received messages and attached files corresponding respectively thereto on the screen at step 96. Subsequently, the specific client releases the connection to the server 30 at step 98. In this manner, each client can check received mails.

Figure 10:
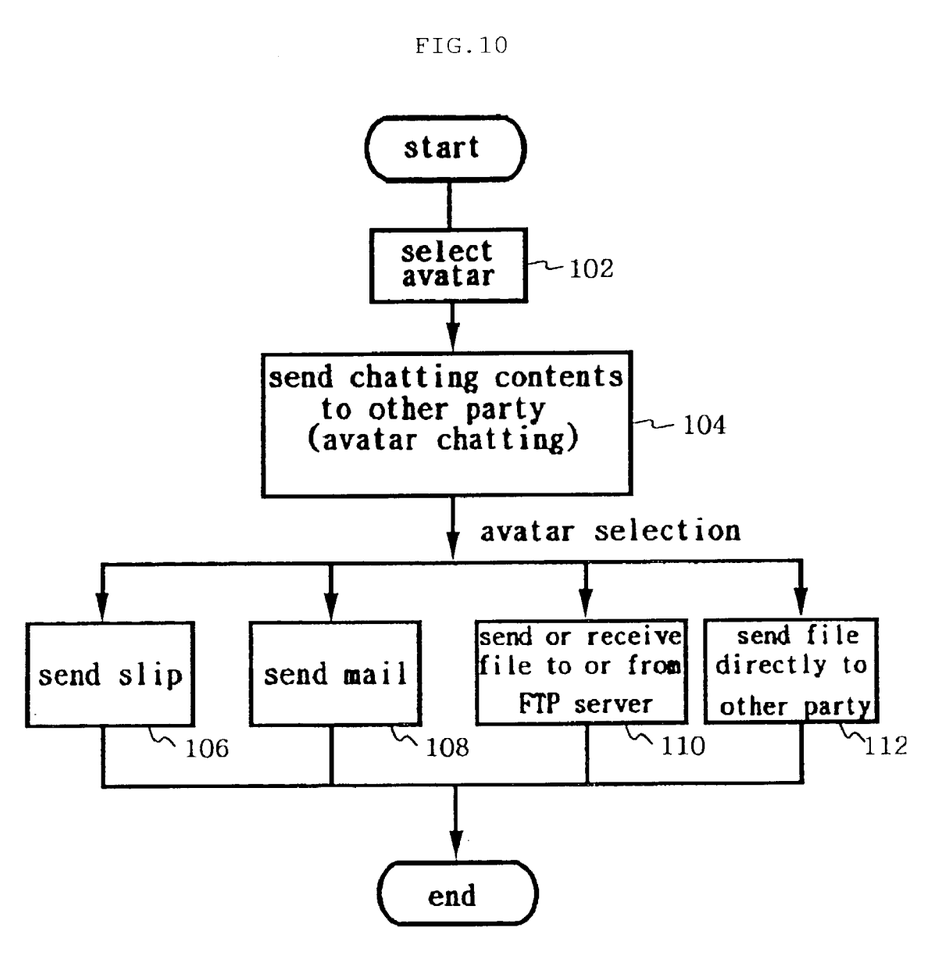
FIG. 10 is a flowchart illustrating an avatar chatting step in FIG. 2.

FIG. 10 is a flowchart illustrating the avatar chatting step 58 in FIG. 2. For avatar chatting, a specific client first selects an avatar of the other party at step 102 and then sends the contents of chatting to the selected avatar at step 104. Alternatively, the specific client may send a slip to a desired avatar at step 106, send a mail to the desired avatar at step 108, send or receive a file to or from the FTP server at step 110 or send a file directly to the other party at step 112. At any step, the corresponding function is performed by selecting an avatar of the other party as in the above step 102.

Figure 11:
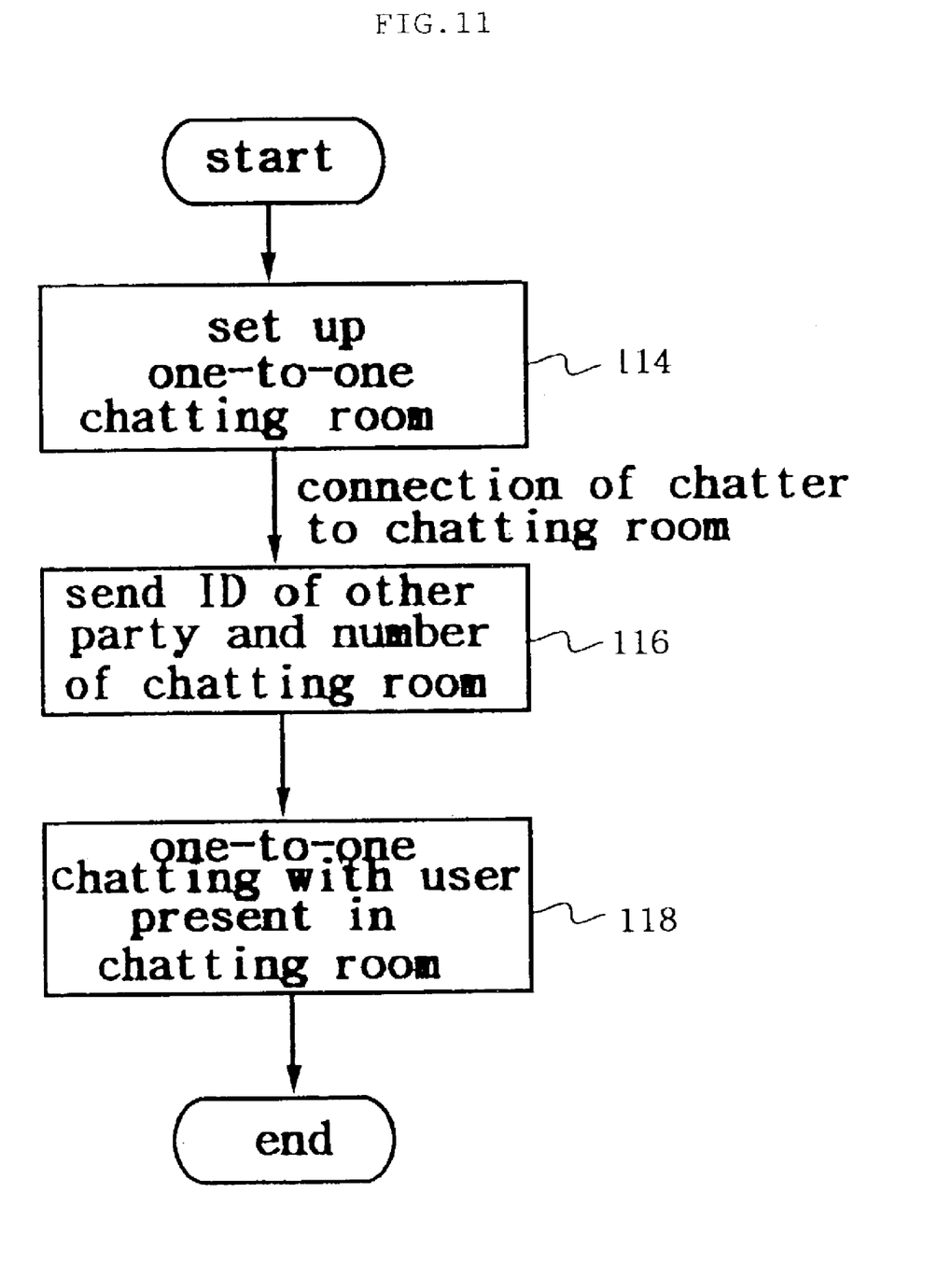
FIG. 11 is a flowchart illustrating a peer-to-peer chatting step in FIG. 2.

FIG. 11 is a flowchart illustrating the peer-to-peer chatting step 60 in FIG. 2. For peer-to-peer chatting, a specific client first sets up a one-to-one chatting room at step 114 and then sends an ID of the other party and a number of the set-up chatting room to the messaging server at step 116. As a result, the specific client can conduct one-to-one chatting with a user present in the chatting room at step 118.

Figure 12:
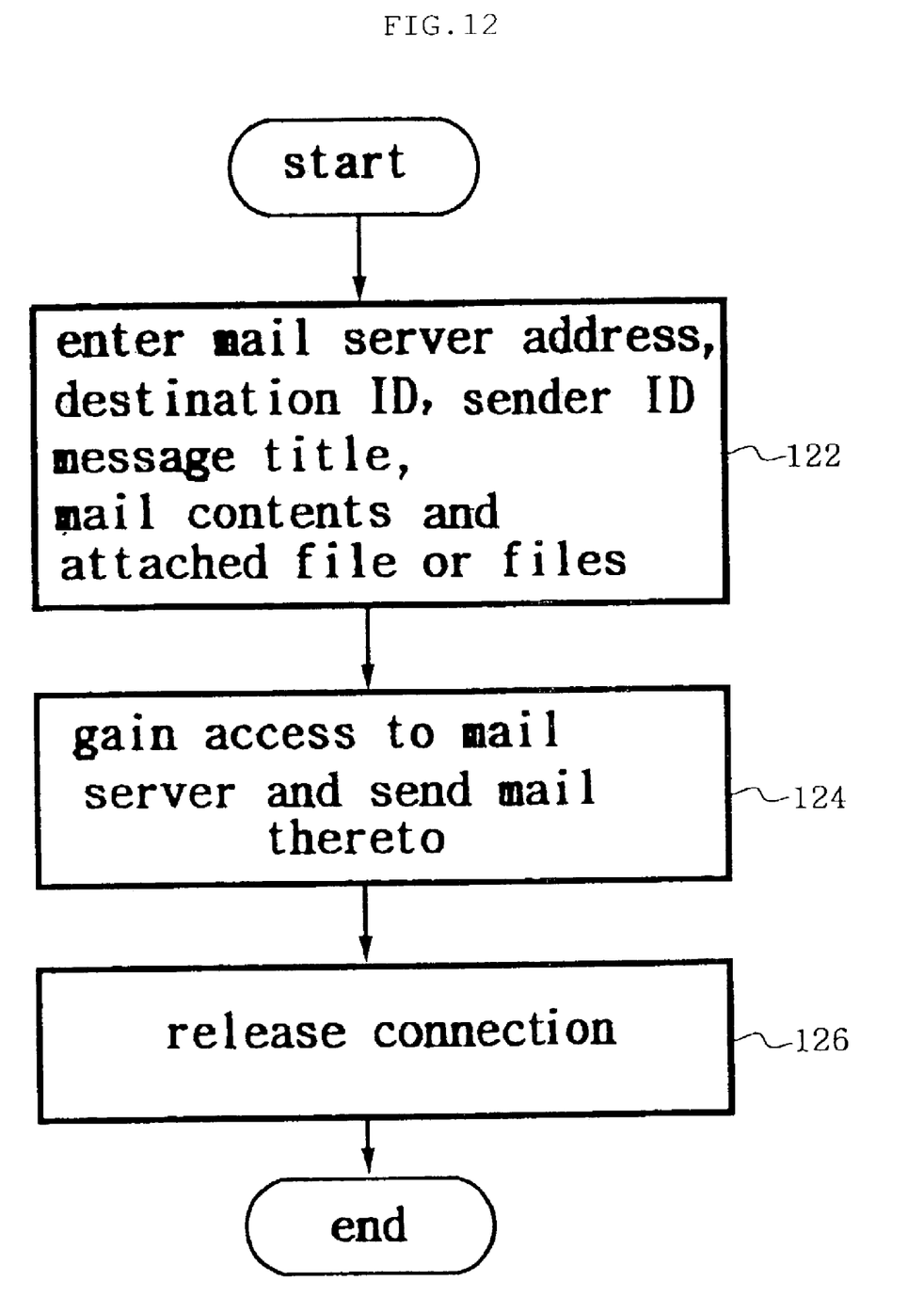
FIG. 12 is a flowchart illustrating a mail sending step in FIG. 2.

FIG. 12 is a flowchart illustrating the mail sending step 62 in FIG. 2. For sending of a mail to the other party, a specific client first enters a "mail server address", a "destination ID", a "sender ID", a "message title", "mail contents" and an "attached file or files" at step 122. Thereafter, if the specific client enters a send command, then a mail is sent to the mail server at step 124. Subsequently, the mail sending client proceeds to step 126 to release the connection to the server 30.

Figure 13:
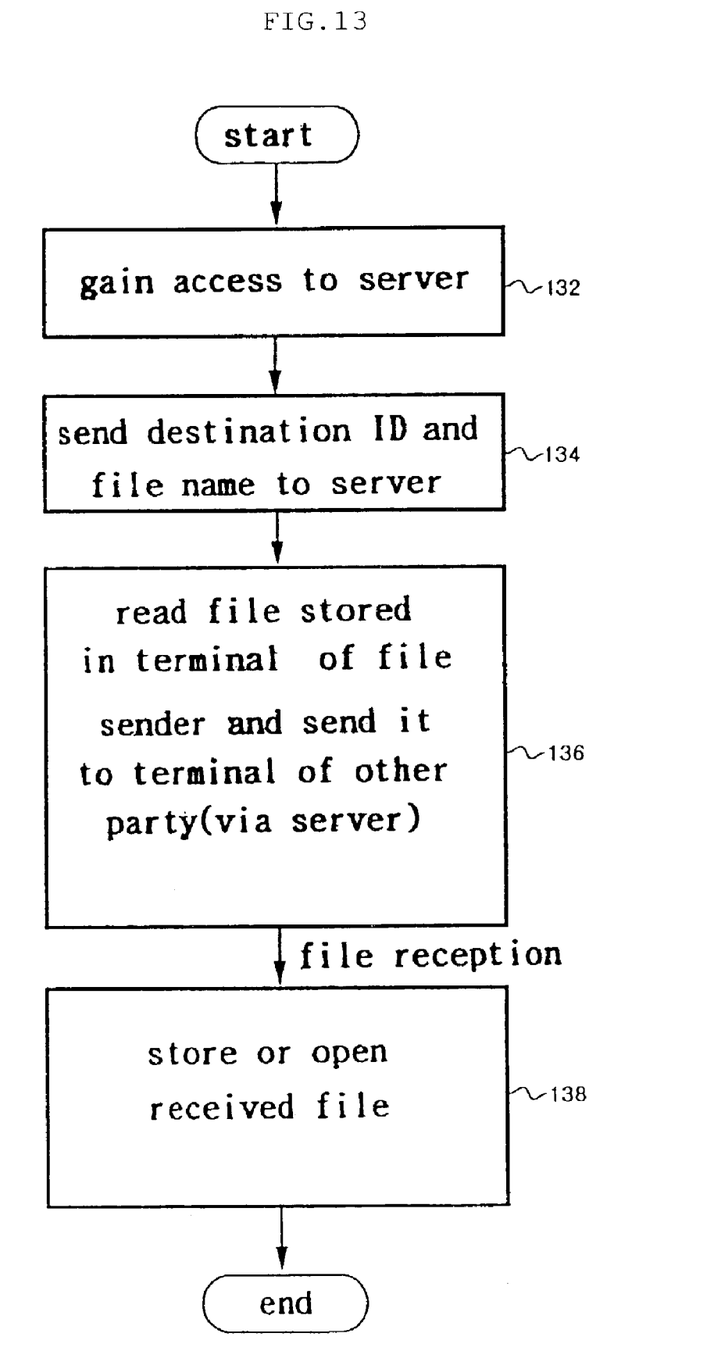
FIG. 13 is a flowchart illustrating the step in FIG. 2 of directly sending a file to the other party.

FIG. 13 is a flowchart illustrating the step 64 in FIG. 2 of directly sending a file to the other party. For direct sending of a file to the other party, a specific client first enters a server address and port number at step 132 to gain access to the server 30, and then sends a destination ID and file name to the server 30 at step 134. At step 136, a terminal of the file sender reads a file stored therein according to a program therein and sends the read file to a terminal of the other party via the server 30. Then, the other client stores or opens the sent file at step 138.

Figure 14:
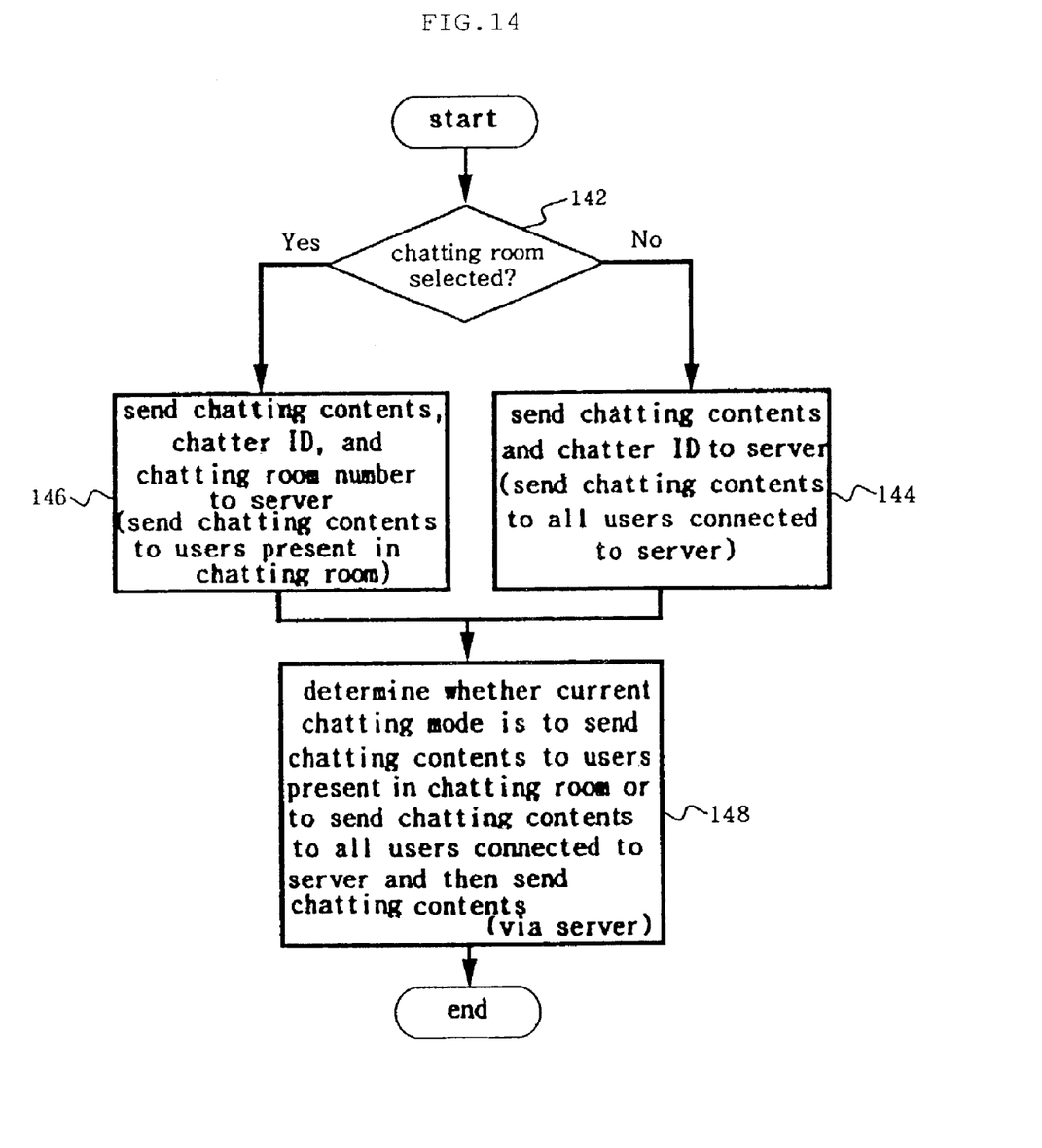
FIG. 14 is a flowchart illustrating a multi-peer chatting step in FIG. 2.

FIG. 14 is a flowchart illustrating the multi-peer chatting step 66 in FIG. 2. In the present embodiment, the multi-peer chatting function is classified into two modes, one where a client selects a chatting room and chats with users present in the selected chatting room and the other where a client chats with all users connected to the server 30 without selecting the chatting room. In other words, if a specific client selects the multi-peer chatting function and, in turn, a chatting room, displayed on the screen in response to the function selection, at step 142, then it proceeds to step 146 to send the contents of chatting to users present in the selected chatting room. In this case, the specific client sends "chatting contents", a "chatter ID" and a "chatting room number" to the server 30.

On the other hand, in the case where the specific client does not select the displayed chatting room at the above step 142, it sends the contents of chatting to all users connected to the server 30 at step 144. In this case, the specific client sends "chatting contents" and a "chatter ID" to the server 30. At step 148, the server 30 determines according to the presence or not of a "chatting room number" in received data whether the current chatting mode is to send the chatting contents to users present in the chatting room or to send the chatting contents to all users connected thereto. Subsequently, the server 30 determines whether receivers are online or offline, and then sends the chatting contents to the receivers determined to be online. Through this procedure, each client can conduct the multi-peer chatting.

Figure 15:
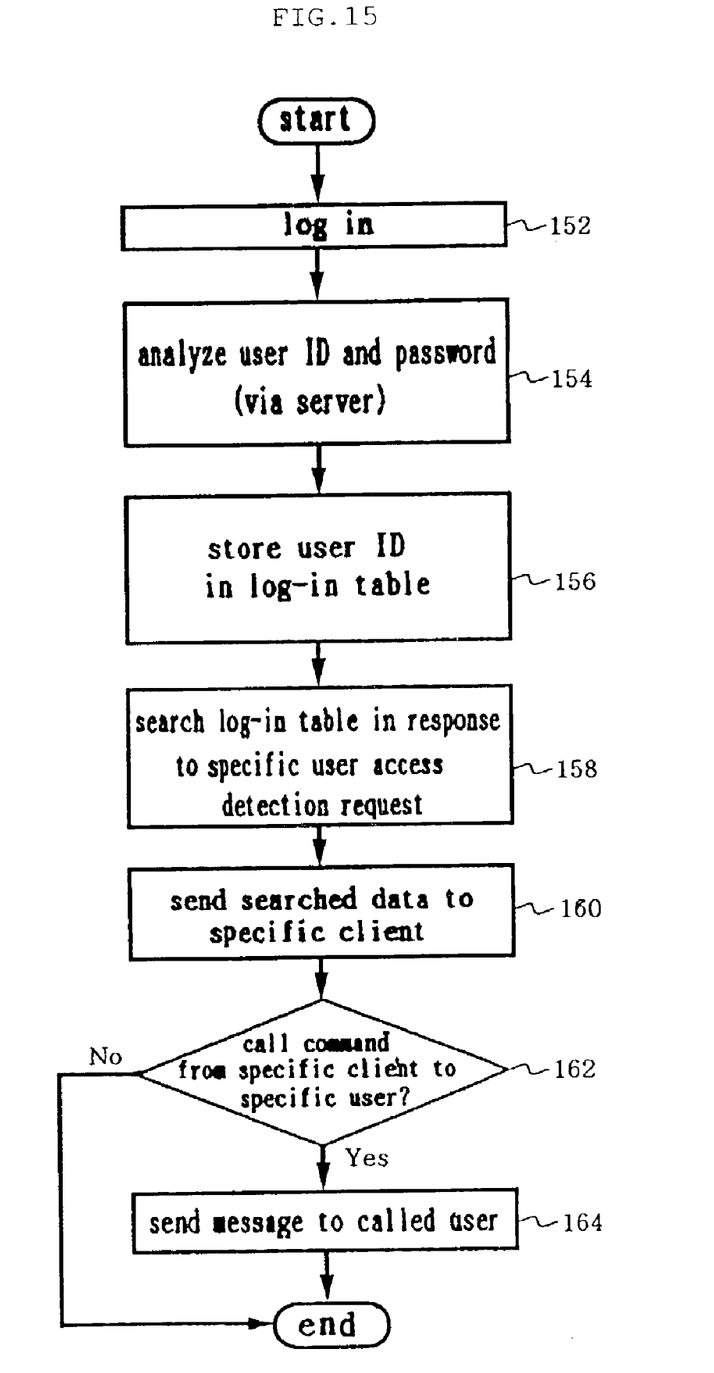
FIG. 15 is a flowchart illustrating a specific user access detection/call step in FIG. 2.

FIG. 15 is a flowchart illustrating the specific user access detection/call step in FIG. 2. For detection of access by a specific user, a specific client first logs in to the server 30 at step 152. In this case, the server 30 analyzes a user ID and password of the specific client logging in thereto at step 154 to determine whether the specific client is a registered member. If the specific client is a registered member, the server 30 permits it user connection thereto and stores the user ID in a log-in table at step 156. If the specific client requests the server 30 to detect access by a specific user, then the server 30 searches the log-in table for data about the specific user at step 158 and sends the searched data to the specific client at step 160. Thereafter, if there is a call command from the specific client to the specific user at step 162, then the server 30 sends a message to a called user, or the specific user, at step 164. As a result, the called user can respond to the call from the calling user, or the specific client.

Figure 16:
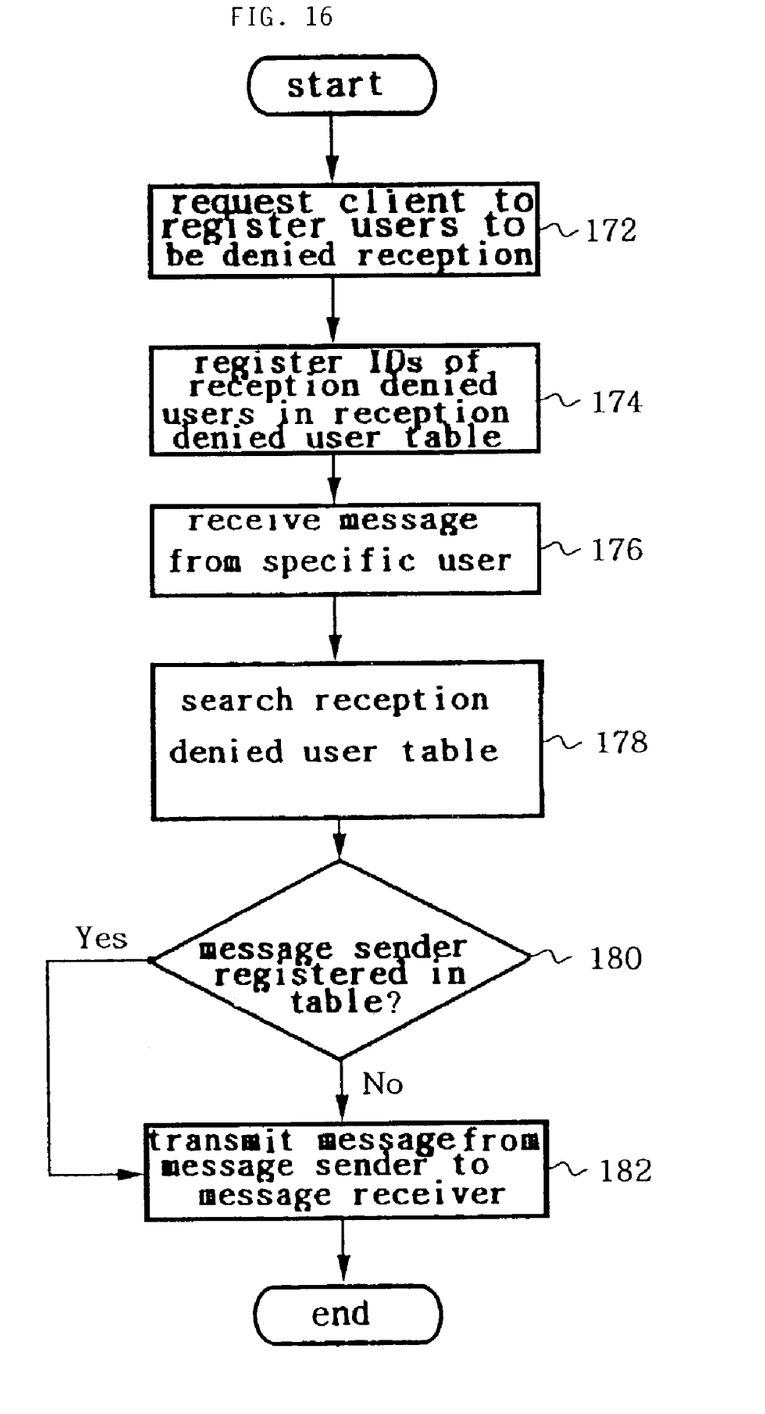
FIG. 16 is a flowchart illustrating a specific user reception denial step in FIG. 2.

FIG. 16 is a flowchart illustrating the specific user reception denial step in FIG. 2. First, if a specific client selects a specific user reception denial function in the initial menu picture shown in FIG. 3, then the server 30 displays a picture to request the specific client to register users to be denied reception, on the screen at step 172. Subsequently, if the specific client enters IDs (user names, avatars, etc.) of the reception denied users in the displayed picture, then the server 30 registers the IDs of the reception denied users in a reception denied user table at step 174. Thereafter, upon receiving a message from a specific user at step 176, the server 30 searches the reception denied user table at step 178 to determine whether the message sender was registered in the table. Upon determining at step 180 that the message sender was registered in the reception denied user table, the server 30 ends a specific user reception denial subroutine. However, in the case where it is determined at step 180 that the message sender was not registered in the reception denied user table, the server 30 proceeds to step 182 to transmit the message from the message sender to the message receiver, or the specific client.

As a result, each client can deny the reception of a message sent from a specific user.

As apparent from the above description, the present invention provides a multimedia communication method using a virtual world interface in mobile personal computers wherein a mobile personal computer is capable of readily transmitting or retrieving multimedia data using a virtual world interface and an instant messenger program, thereby enabling information to rapidly and accurately be exchanged at any time or place. Further, desired media data can conveniently be transmitted or retrieved by merely a clicking operation of a stylus pen or a drag operation of a mouse without executing a multiplicity of individual programs for transmission and/or retrieval of different media data.

The present multimedia communication method is based on avatar and space concepts such that users, which are targets of a personal information inquiry function and other functions, can be distinguished from other users according to the outer appearances of avatars as well as text IDs, and users participating in chatting can dispose their avatars in desired places in a virtual world and change the positions of the avatars during chatting. Further, in addition to text and voice, users can express actions with feelings through avatars, so that they can more realistically and intimately chat with one another.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for communication of multimedia data in a mobile personal computer which includes a virtual world interface and an instant messenger program and is connected to a server over any one of wired and wireless communication networks, said method comprising the steps of:

a) logging in to said server;

b) displaying an initial menu picture on a screen of said mobile personal computer, said initial menu picture including a plurality of menu items for transmission or retrieval of the multimedia data; wherein said menu items include an avatar chatting function, a specific user access detection/call function a specific user reception denial function, and a direct file sending item;

c) performing a subroutine associated with a selected one of said menu items in said initial menu picture to transmit or retrieve said multimedia data, wherein said menu items include an avatar chatting function, a specific user access detection/call function and a specific user reception denial function, wherein said step c) is adapted to, if said specific user reception denial item is selected, perform a subroutine including the steps of:

c-1) requesting said mobile personal computer to register users to be denied reception;

c-2) registering identifications of the reception denied users in a reception denied user table in said server;

c-3) searching said reception denied user table upon receiving a message from a specific user; and c-4) transmitting the message received from said specific user to said mobile personal computer only when said specific user is not registered in said reception denied user table; and d) performing a subroutine associated with a selected one of said menu items in said initial menu picture to transmit or retrieve said multimedia data, wherein said step c) is adapted to, if said avatar chatting item is selected, perform a subroutine including the steps of: d-1) selecting a desired avatar; and d-2) sending the contents of chatting to a client of the selected avatar, and if any one of a mail sending item, a direct file sending item and an item for file sending or reception to or from said file transfer protocol server is selected, additionally perform a subroutine associated with said selected item.

2. The method as set forth in claim 1, further comprising e) performing a subroutine associated with a selected one of said menu items in said initial menu picture to transmit or retrieve said multimedia data, wherein said step c) is adapted to, if said direct file sending item is selected, perform a subroutine including the steps off e-1) selecting a file to be sent; and e-2) clicking an avatar of the other party, and e-3) sending the selected file directly to the other party.

* * * * *